(12) United States Patent
Shi

(10) Patent No.: US 11,357,008 B2
(45) Date of Patent: Jun. 7, 2022

(54) METHODS AND TERMINAL DEVICE FOR ACTIVATING A SEMI-PERSISTENTLY CONFIGURED RESOURCE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/207,107

(22) Filed: Mar. 19, 2021

(65) Prior Publication Data

US 2021/0212066 A1 Jul. 8, 2021

Related U.S. Application Data

(63) Continuation of application No. PCT/CN2018/107819, filed on Sep. 27, 2018.

(51) Int. Cl.
*H04W 72/04* (2009.01)
*H04W 76/11* (2018.01)
*H04W 76/27* (2018.01)
*H04L 5/00* (2006.01)

(52) U.S. Cl.
CPC ......... *H04W 72/0453* (2013.01); *H04L 5/001* (2013.01); *H04L 5/0098* (2013.01); *H04W 72/042* (2013.01); *H04W 76/11* (2018.02); *H04W 76/27* (2018.02)

(58) Field of Classification Search
CPC . H04W 72/0453; H04W 76/11; H04W 76/27; H04W 72/042; H04L 5/001; H04L 5/0098
See application file for complete search history.

(56) References Cited

U.S. PATENT DOCUMENTS

| | | | |
|---|---|---|---|
| 2018/0183551 A1 | 6/2018 | Chou et al. | |
| 2019/0215871 A1* | 7/2019 | Aiba | H04W 74/0833 |
| 2020/0280357 A1* | 9/2020 | Bae | H04W 72/04 |
| 2021/0099902 A1* | 4/2021 | Takeda | H04W 24/10 |

FOREIGN PATENT DOCUMENTS

CN 105592557 5/2016

OTHER PUBLICATIONS

U.S. Appl. No. 62/616,233, Aiba et al., User Equipments, Base Stations and Methods, filed Jan. 11, 2018, pp. 1-102 (Year: 2018).*
Ericsson, "Remaining issues on CSI reporting," 3GPP TSG RAN WG1 Meeting #92bis, R1-1804973, Apr. 2018, 8 pages.
Samsung, "Procedures for Grant-Free UL Transmissions," 3GPP TSG RAN WG1 NR Ad-Hoc#2, R1-1710723, Jun. 2017, 3 pages.

(Continued)

*Primary Examiner* — Omar J Ghowrwal
(74) *Attorney, Agent, or Firm* — Hodgson Russ LLP

(57) ABSTRACT

Methods for activating a semi-persistently configured resource and a terminal device are provided. The method includes receiving, by a terminal device, a first instruction, where the first instruction is used for activating a semi-persistently configured resource of a first BWP in a non-activated state.

15 Claims, 5 Drawing Sheets

(56) References Cited

OTHER PUBLICATIONS

WIPO, International Search Report and Written Opinion for PCT/CN2018/107819, dated Jun. 26, 2019.
Mediatek Inc, "Summary of Bandwidth Part Operation", 3GPP TSG RAN WG1 Meeting 91, R1-1721504, Nov. 2017, 13 pages.
Asustek, "Remaining issues on BWP inactivity timer", 3GPP-TSG RAN WG1 Meeting #AH-1801, R2-1800044, Jan. 2018, 7 pages.
EPO, Extended European Search Report for EP Application No. 18935584.5, dated Jul. 27, 2021.
EPO, Communication for EP Application No. 18935584.5, dated Feb. 4, 2022.
IPI, Office Action for IN Application No. 202117011313, dated Feb. 2, 2022.

* cited by examiner

Receive, by a terminal device, a first instruction, where the first instruction is used for activating a semi-persistently configured resource of a first BWP in a non-activated state — 201

METHODS AND TERMINAL DEVICE FOR ACTIVATING A SEMI-PERSISTENTLY CONFIGURED RESOURCE

CROSS-REFERENCE TO RELATED APPLICATION(S)

This application is a continuation of International Application No. PCT/CN2018/107819, filed on Sep. 27, 2018, the entire disclosure of which is incorporated herein by reference.

TECHNICAL FIELD

The present disclosure relates to the technical field of wireless communications, and in particular, to methods for activating a semi-persistently configured resource and a terminal device.

BACKGROUND

In a new radio (NR) Rel-15 system, an activation instruction for semi-persistent scheduling (SPS) merely acts on a semi-persistent resource of an uplink bandwidth part (BWP) in an activated state rather than a BWP in a non-activated state, so that when the terminal device performs BWP switching, a semi-persistent resource of a newly activated BWP cannot be used before the activation instruction for SPS is received, which increases delay of service processing.

SUMMARY

Implementations of the present disclosure provide methods for activating a semi-persistently configured resource and a terminal device.

In a first aspect, implementations of the present disclosure provide a method for activating a semi-persistently configured resource. The method includes receiving, by a terminal device, a first instruction, where the first instruction is used for activating a semi-persistently configured resource of a first BWP in a non-activated state.

In a second aspect, implementations of the present disclosure provide a method for activating a semi-persistently configured resource. The method includes transmitting, by a network device, a first instruction, where the first instruction is used for directing a terminal device to activate a semi-persistently configured resource of a first BWP in a non-activated state.

In a third aspect, implementations of the present disclosure provide a terminal device. The terminal device includes a transceiver, at least one processor, and a memory storing computer programs. The computer programs, when executed by the at least one processor, cause the transceiver to receive a first instruction, where the first instruction is used for activating a semi-persistently configured resource of a first BWP in a non-activated state.

DETAILED DESCRIPTION

Figures 1, 2A:
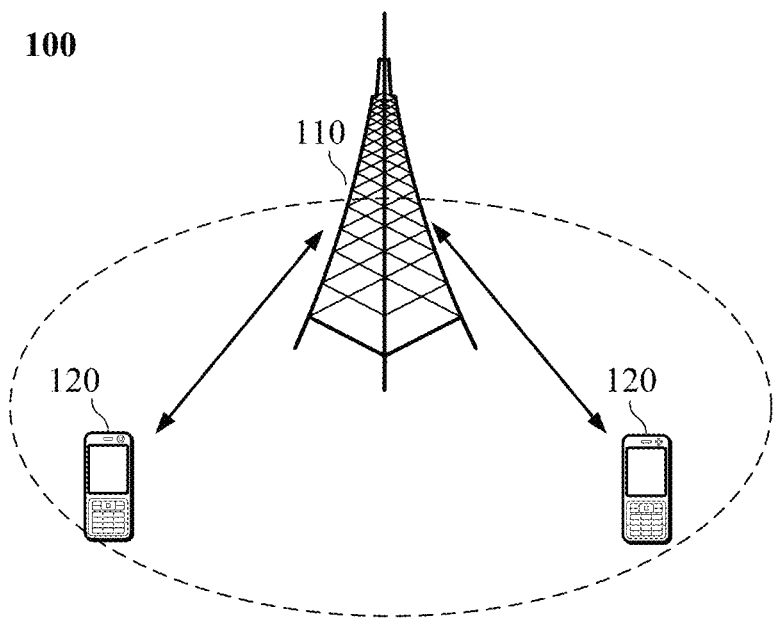
FIG. 1 is a schematic structural diagram illustrating a communication system according to an implementation of the present disclosure.
FIG. 2A is a schematic flow chart illustrating a method for activating a semi-persistently configured resource applied to a terminal device according to an implementation of the present disclosure.

In order to understand features and technical contents of implementations of the present disclosure in detail, the implementations of the present disclosure will be described in detail below with reference to the accompanying drawings. The attached accompanying drawings are merely for reference and explanation and not used to limit the implementations of the present disclosure.

Before illustrating the implementations of the present disclosure in detail, at first, a bandwidth part (BWP) is briefly illustrated.

A system bandwidth supported by a new radio (NR) system is much larger than a maximum system bandwidth (20 MHz) supported by a long term evolution (LTE) system. However, due to limited capability of a terminal device, the terminal device cannot support all system bandwidths. In order to improve a scheduling efficiency of the NR system, the BWP is introduced. In a radio resource control (RRC) connection state, a network device configures one or more BWPs for the terminal device.

The BWP mainly includes three parameters, namely a parameter set, a center frequency point, and a bandwidth. The parameter set contains a basic parameter set and a subcarrier spacing (SCS), and the bandwidth is smaller than or equal to a maximum system bandwidth.

Therefore, the BWP is a concept of frequency-domain dimension, and in the related art, the terminal device only supports one activated BWP. Activation means that the terminal device receives signals on the bandwidth specified by the BWP, including uplink and downlink data transmission, system messages, etc.

The network device transmits an instruction to configure that the terminal device switches between different BWPs, so as to deactivate a current BWP and activate a new BWP. An activation instruction may include the following: 1) RRC dedicated signaling; 2) downlink control information (DCI) or media access control control element (MAC CE); 3) time pattern, i.e., switching between different BWPs according to a certain time rule.

In the related art, for an uplink configured grant transmission mode for which uplink resource transmission is pre-configured and the network device is not required to transmit the DCI to dynamically schedule uplink data transmission, Type1 and Type2 are defined. For Type1, a semi-persistently configured uplink data transmission resource is configured according to the RRC signaling, without participation of L1 signaling (that is, the DCI). For Type2, part of the semi-persistently configured uplink data transmission resource is configured according to the RRC signaling, and the other part of the semi-persistently configured uplink data transmission resource is configured through the L1 signaling (that is, the DCI). The L1 signaling can be used for activating or deactivating the semi-persistently configured uplink data transmission resource.

The present disclosure provides a method for activating a semi-persistently configured resource. The method for resource indication in implementations of the present disclosure can be applied to various communication systems, such as a global system of mobile communication (GSM), a code division multiple access (CDMA) system, a wideband code division multiple access (WCDMA) system, general packet radio service (GPRS), an LTE system, an LTE frequency division duplex (FDD) system, an LTE time division duplex (TDD) system, a universal mobile telecommunication system (UMTS), a worldwide interoperability for microwave access (WiMAX®) communication system, a fifth generation (5G) system, or the like.

For example, a communication system 100 in an implementation of the present disclosure is illustrated in FIG. 1. The communication system 100 may include a network device 110. The network device 110 can communicate with a terminal 120 (or called a communication terminal or a terminal). The network device 110 can provide communication coverage for a specific geographic area and communicate with terminals in the coverage area. In an implementation, the network device 110 may be a base station (base transceiver station, BTS) in the GSM or CDMA system, a base station (NodeB, NB) in the WCDMA system, an evolutional base station (evolutional node B, eNB or eNodeB) in the LTE system, or a wireless controller in a cloud radio access network (CRAN). In an implementation, the network device 110 may be a mobile switch center, a relay station, an access point, a vehicle-mounted device, a wearable device, a hub, a switch, a network bridge, a router, a network device in the 5G network, a network device in a future evolution public land mobile network (PLMN), or the like The communication system 100 further includes at least one terminal device 120 in the coverage area of the network device 110. The "terminal device" used herein may include but is not limited to a device coupled via a wired line, and/or other data connection/network, and/or a wireless interface, and/or a device communicating with another terminal to receive/transmit communication signals, and/or an Internet of Things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via the wireless interface may be called a "wireless communication terminal", a "wireless terminal", or a "mobile terminal". Examples of a mobile terminal may include, but are not limited to, a satellite or cellular telephone, a personal communication system (PCS) terminal capable of combining cellular radio telephone and data processing, fax and data communication, a personal digital assistant (PDA) equipped with radio telephone, pager, Internet/Intranet access, web browsing, a notebook, a calendar, and/or a global positioning system (GPS) receiver, and a conventional laptop and/or a handheld receiver or other electronic devices equipped with a radio telephone transceiver. The terminal device may refer to an access terminal, user equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with a wireless communication function, a computing device or other processing devices coupled with wireless modems, a vehicle-mounted device, a wearable device, a terminal device in the 5G network or the future evolution PLMN, or the like.

In an implementation, the terminal devices 120 may communication with each other via device to device (D2D) communication.

In an implementation, the 5G system or 5G network may also be referred to as the NR system or an NR network.

As an example, FIG. 1 illustrates a network device and two terminal devices. In an implementation, the communication system 100 may include multiple network devices, and in the coverage area of each network device, there may be one or more terminal devices, which is not limited in the implementation of the present disclosure.

In an implementation, the communication system 100 may further include a network controller, a mobility management entity (MME), or other network entities, which is not limited in the implementation of the present disclosure.

It is to be understood that in the implementation of the present disclosure, in a network/system, a device with a communication function can be called a communication device. The communication system 100 illustrated in FIG. 1 is taken as an example. The communication devices may include the network device 110 and the terminal device 120 that have a communication function. The network device 110 and the terminal device 120 may be the devices described above, which is not repeated herein. The communication devices may further include other devices in the communication system 100, such as the network controller, the MME, or other network entities, which is not limited in the implementation of the present disclosure.

FIG. 2A is a flow chart illustrating a method for activating a semi-persistently configured resource applied to a terminal device according to an implementation of the present disclosure. As illustrated in FIG. 2A, the method includes the following.

At block 201, the terminal device receives a first instruction, where the first instruction is used for activating a semi-persistently configured resource of a first BWP, and the first BWP is in a non-activated state.

Herein, the first instruction is transmitted by a network device.

In an implementation of the present disclosure, the first instruction at least includes any of the following: DCI, an RRC signaling, and an MAC CE.

The DCI or the RRC signaling includes an indication field containing an index of one non-activated BWP or a group of non-activated BWPs; or the first instruction includes an index of a semi-persistently configured resource of one non-activated BWP or a group of non-activated BWPs; or the first instruction includes an indication field containing an index of one non-activated BWP or a group of non-activated BWPs, and an index of a semi-persistently configured resource of one non-activated BWP or a group of non-activated BWPs.

In some implementations, a physical downlink control channel (PDCCH) carrying the DCI is scrambled with a first radio network temporary identifier (RNTI). The first RNTI is a new RNTI different from an existing RNTI. The existing RNTI at least includes a cell radio network temporary identifier (C-RNTI) and configured scheduling radio network temporary identifier (CS-RNTI).

In some implementations, the semi-persistently configured resource includes at least one of the following: 1) an uplink semi-persistently configured source of Type 2; 2) a downlink semi-persistently configured resource; 3) a semi-persistently configured channel state information reference signal (CSI-RS) resource, a semi-persistently configured CSI resource, and a semi-persistently configured sounding reference signal (SRS) resource.

According to the implementations of the present disclosure, when the first BWP is in the non-activated state, the terminal device can activate the semi-persistently configured resource of the first BWP according to the first instruction transmitted by the network device, such that when the terminal device switches to the first BWP (i.e., the first BWP is in an activated state), the semi-persistently configured resource of the first BWP can be immediately used, thereby reducing delay caused by that in the related art after the first BWP is activated, the semi-persistently configured resource of the first BWP is then activated according to an activation instruction. Meanwhile, when the first BWP is in the non-activated state, the semi-persistently configured resource of the first BWP is activated, thereby improving flexibility of the network.

Figure 2B:
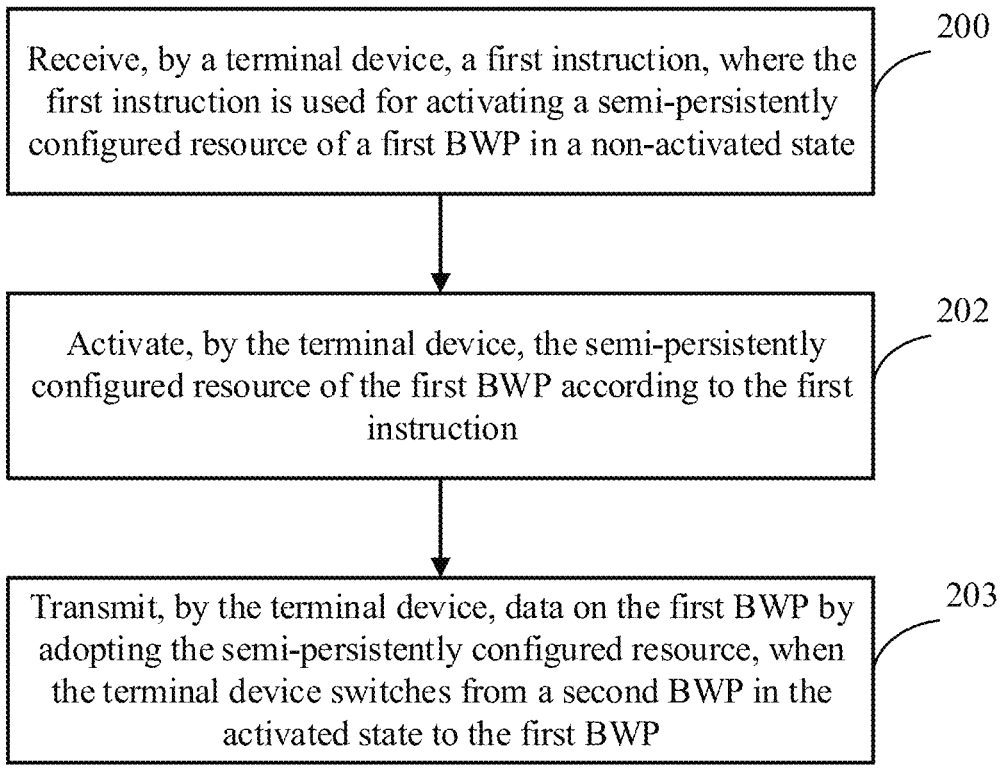
FIG. 2B is a schematic flow chart illustrating a method for activating a semi-persistently configured resource according to an implementation of the present disclosure.

FIG. 2B is a flow chart illustrating a method for activating a semi-persistently configured resource applied to a terminal device according to an implementation of the present disclosure. As illustrated in FIG. 2B, the method includes the following.

At block 200, the terminal device receives a first instruction, where the first instruction is used for activating a semi-persistently configured resource of a first BWP in a non-activated state.

At block 202, the terminal device activates the semi-persistently configured resource of the first BWP according to the first instruction.

At block 203, when the terminal device switches from a second BWP in the activated state to the first BWP, the terminal device transmits data on the first BWP by adopting the semi-persistently configured resource.

In an implementation of the present disclosure, when the terminal device receives a BWP switching instruction from the network device, the terminal device switches from the second BWP in the activated state to the first BWP. The switching instruction includes the DCI or RRC.

Herein, a cycle of the semi-persistently configured resource is pre-configured according to the RRC signaling. A starting position of the cycle of the semi-persistently configured resource is determined by a time point at which the first BWP is activated by the terminal device.

In some implementations, the time point at which the first BWP is activated by the terminal device is a time point at which the BWP switching instruction is received by the terminal device, a time point at which a random access process that causes the BWP switching is initiated, or a time point at which a pre-configured timer reaches a preset duration.

Herein, the time point at which the random access process that causes the BWP switching is initiated is for a condition that switching from the second BWP to the first BWP by the terminal device is caused by initiating the random access process by the terminal device. The time point at which the first BWP is activated is the time point at which the random access process is initiated by the terminal device. The time point at which the pre-configured timer reaches the preset duration refers to that a timer is configured for the terminal device and a duration is set for the timer, and when the set duration reaches, the terminal device activates the first BWP.

What needs to be illustrated is that in the implementation of the present disclosure, the first instruction and the BWP switching instruction may be the same instruction or different instructions.

Figure 3A:
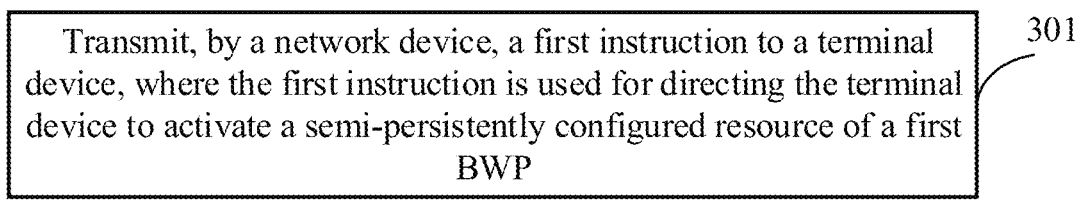
FIG. 3A is a schematic flow chart illustrating a method for activating a semi-persistently configured resource applied to a network device according to an implementation of the present disclosure.

Implementations of the present disclosure further provides a method for resource indication applied to a network device. A processing flow of the method is illustrated in FIG. 3A and includes the following.

At block 301, the network device transmits a first instruction to a terminal device, where the first instruction is used for directing the terminal device to activate a semi-persistently configured resource of a first BWP.

Herein, the first BWP is in a non-activated state.

In the implementation of the present disclosure, illustration of the first instruction and the semi-persistently configured resource is the same as that of the first instruction and the semi-persistently configured resource at block 201, which will not be repeated herein.

Figure 3B:
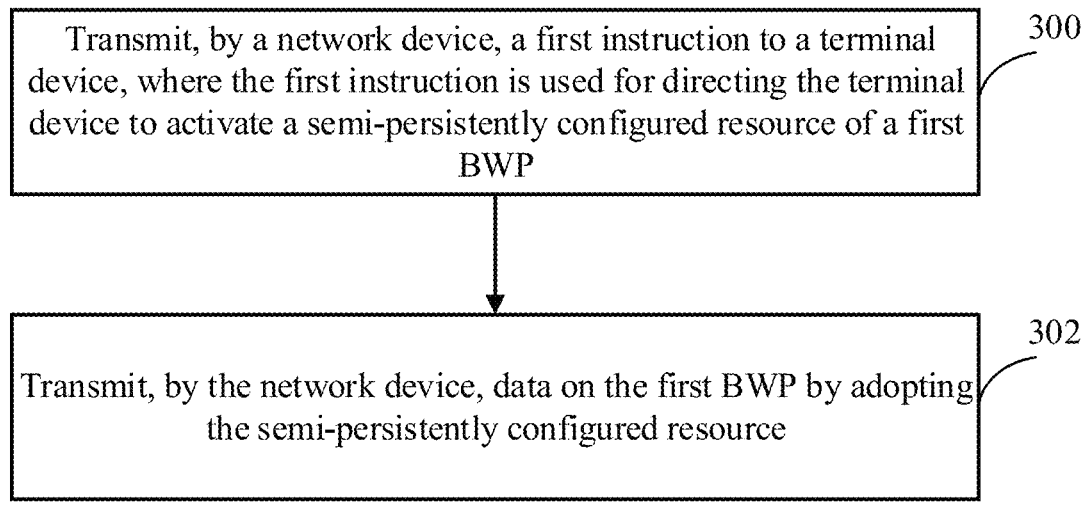
FIG. 3B is a schematic flow chart illustrating a method for activating a semi-persistently configured resource according to an implementation of the present disclosure.

FIG. 3B is a flow chart illustrating a method for activating a semi-persistently configured resource applied to a network device according to an implementation of the present disclosure. As illustrated in FIG. 3B, the method includes the following.

At block 300, the network device transmits a first instruction to a terminal device, where the first instruction is used for directing the terminal device to activate a semi-persistently configured resource of a first BWP in a non-activated state.

At block 302, the network device transmits data on the first BWP by adopting the semi-persistently configured resource.

In the implementation of the present disclosure, illustration of a time point at which the first BWP is activated and a BWP switching instruction is the same as that of the time point at which the first BWP is activated and the BWP switching instruction at block 5202, which will not be repeated herein.

Figure 4:
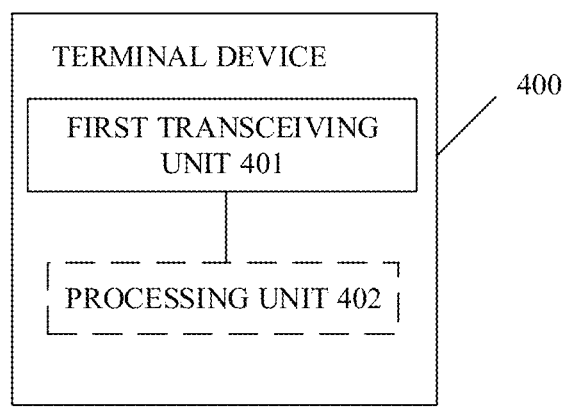
FIG. 4 is a schematic structural diagram illustrating a terminal device according to an implementation of the present disclosure.

Implementations of the present disclosure further provides a terminal device. A component structure of a terminal device 400 is illustrated in FIG. 4. The terminal device 400 includes a first transceiving unit 401 configured to receive a first instruction, where the first instruction is used for activating a semi-persistently configured resource of a first BWP in a non-activated state.

In an implementation of the present disclosure, the terminal device 400 further includes a processing unit 402 configured to activate the semi-persistently configured resource of the first BWP according to the first instruction.

In an implementation of the present disclosure, the first transceiving unit 401 is further configured to transmit data on the first BWP by adopting the semi-persistently configured resource, when the terminal device 400 switches from a second BWP in an activated state to the first BWP.

In an implementation of the present disclosure, a starting position of a cycle of the semi-persistently configured resource is determined by a time point at which the first BWP is activated by the terminal device. The cycle of the semi-persistently configured resource is pre-configured according to an RRC signaling.

In an implementation of the present disclosure, the time point at which the first BWP is activated by the processing unit 402 includes: a time point at which a BWP switching instruction is received by the terminal device; a time point at which a random access process that causes BWP switching is initiated; or a time point at which a pre-configured timer reaches a preset duration.

In an implementation of the present disclosure, the BWP switching instruction includes DCI or the RCC signaling.

In an implementation of the present disclosure, the first instruction at least includes any of the DCI, the RRC signaling, and a MAC CE.

In an implementation of the present disclosure, the DCI or the RRC signaling includes: an indication field containing an index of one non-activated BWP or a group of non-activated BWPs; and/or an index of a semi-persistently configured resource of one non-activated BWP or a group of non-activated BWPs.

In an implementation of the present disclosure, a PDCCH carrying the DCI is scrambled with a first RNTI, where the first RNTI is different from a C-RNTI and a CS-RNTI.

In an implementation of the present disclosure, the first instruction and the BWP switching instruction are the same instruction or different instructions.

In an implementation of the present disclosure, the semi-persistently configured resource includes at least one of: an uplink semi-persistently configured resource of Type2, a downlink semi-persistently configured resource, a semi-persistently configured CSI-RS resource, a semi-persistently configured CSI resource, or a semi-persistently configured SRS resource.

Figure 5:
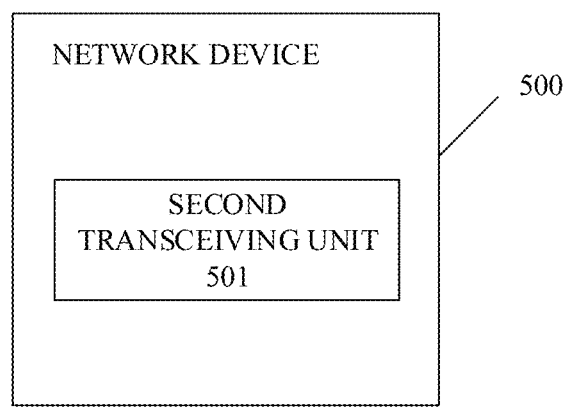
FIG. 5 is a schematic structural diagram illustrating a network device according to an implementation of the present disclosure.

Implementation of the present disclosure further provide a network device. A component structure of a network device 500 is illustrated in FIG. 5 and includes a second transceiving unit 501 configured to transmit a first instruction, where the first instruction is used for directing a terminal device to activate a semi-persistently configured resource of a first BWP in a non-activated state.

In an implementation of the present disclosure, the second transceiving unit 501 is further configured to transmit data on the first BWP by adopting the semi-persistently configured resource, when the terminal device switches from a second BWP in an activated state to the first BWP.

In an implementation of the present disclosure, a starting position of a cycle of the semi-persistently configured resource is determined by a time point at which the first BWP is activated by the terminal device. The cycle of the semi-persistently configured resource is pre-configured according to an RRC signaling.

In an implementation of the present disclosure, the time point at which the first BWP is activated by the terminal device includes: a time point at which a BWP switching instruction is received by the terminal device; a time point at which a random access process that causes BWP switching is initiated; or a time point at which a pre-configured timer reaches a preset duration.

In an implementation of the present disclosure, the BWP switching instruction includes the DCI or the RCC signaling.

In an implementation of the present disclosure, the first instruction at least includes any of the DCI, the RRC signaling, and an MAC CE.

In an implementation of the present disclosure, the DCI or the RRC signaling includes: an indication field containing an index of one non-activated BWP or a group of non-activated BWPs; and/or an index of a semi-persistently configured resource of one non-activated BWP or a group of non-activated BWPs.

In an implementation of the present disclosure, a PDCCH carrying the DCI is scrambled with a first RNTI, where the first RNTI is different from a C-RNTI and a CS-RNTI.

In an implementation of the present disclosure, the first BWP instruction and the BWP switching instruction are the same instruction.

In an implementation of the present disclosure, the semi-persistently configured resource includes at least one of: an uplink semi-persistently configured resource of Type2, a downlink semi-persistently configured resource, a semi-persistently configured CSI-RS resource, a semi-persistently configured CSI resource, or a semi-persistently configured SRS resource.

Implementations of the present disclosure further provide a terminal device. The terminal device includes a processor and a memory configured to store at least one computer program capable of being run in the processor. The processor is configured to run the computer program to perform the above method for resource indication executed by the terminal device.

Implementations of the present disclosure further provide a network device. The network device includes a processor and a memory configured to store at least one computer program capable of being run in the processor. The processor is configured to run the computer program to perform the above method for resource indication executed by the network device.

Figure 6:
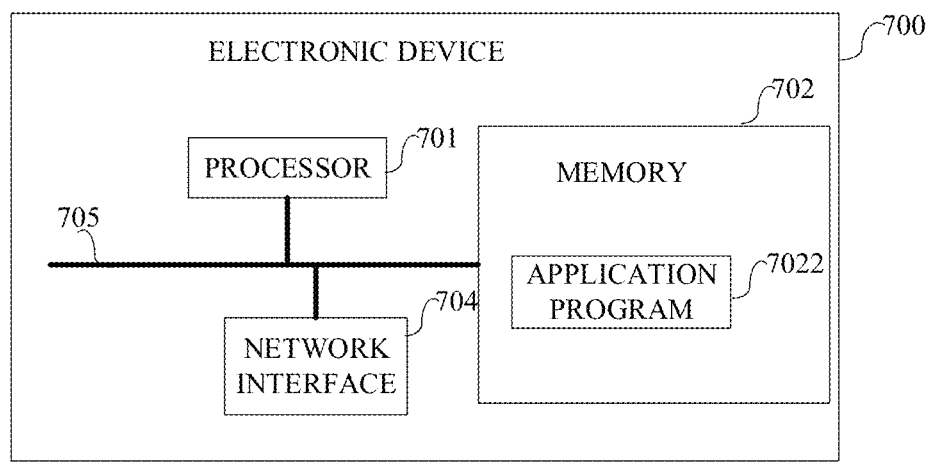
FIG. 6 is a schematic hardware structural diagram illustrating an electronic device according to an implementation of the present disclosure.

FIG. 6 is a schematic hardware structural diagram illustrating an electronic device (network device or terminal device) according to an implementation of the present disclosure. The electronic device 700 includes at least one processor 701, a memory 702, and at least one network interface 704. Various components of the electronic device 700 are coupled with each other via a bus system 705. It can be understood that the bus system 705 is configured to realize a connection communication among these components. The bus system 705 not only includes a data bus, but also includes a power bus, a control bus, and a state signal bus. However, for the sake of clear illustration, in FIG. 6 various buses are called the bus system 705.

It can be understood that the memory 702 may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a disc, or a compact disc read-only memory (CD-ROM). The magnetic surface memory may be a disk memory or a magnetic tape memory. The volatile memory may be a random access memory (RAM) and used for external high-speed cache. By way of examples, but not limitation, various random access memories can be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 702 described in the implementation of the present disclosure is intended to include but is not limited to these memories and memories of any other suitable types.

The memory 702 in the implementation of the present disclosure is configured to store data of various types to support operations of the electronic device 700. Examples of these data include any computer program operated on the electronic device 700, such as an application program 7022. The program for implementing the method provided in the implementation of the present disclosure may be contained in the application program 7022.

The methods disclosed in the foregoing implementations of the present disclosure may be applied to the processor 701 or implemented by the processor 701. The processor 701 may be an integrated circuit chip with signal processing capabilities. In the implementation process, each step of the above methods may be completed by an integrated logic circuit in the form of hardware in the processor 701 or an instruction in the form of software. The above-mentioned processor 701 may be a general-purpose processor, a digital signal processor (DSP), or other programmable logic device, a discrete gate, a transistor logic device, a discrete hardware assembly, and the like. The processor 701 may implement or execute the methods, steps, and logical block diagrams disclosed in the implementations of the present disclosure. The general-purpose processor may be a microprocessor or any conventional processor. The steps of the methods disclosed in the implementations of the present disclosure may be directly executed and completed by a hardware decoding processor, or may be executed and completed by a combination of hardware and software modules in the decoding processor. The software modules may be in a storage medium. The storage medium is in the memory 702. The processor 701 reads information in the memory 702 and completes the steps of the foregoing methods in combination with hardware of the processor 701.

In an exemplary implementation, the electronic device 700 may be implemented with one or more application specific integrated circuits (ASICs), DSPs, programmable logic devices (PLDs), complex programmable logic devices (CPLDs), field-programmable gate arrays (FPGAs), general-purpose processors, controllers, micro control units (MCUs), microprocessor unit (MPUs), or other electronic components, and the electronic device 700 is configured to implement the aforementioned methods.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the terminal device in the implementations of the present disclosure, and the computer program enables the computer to execute corresponding procedures realized by the terminal device in the above methods in the implementations of the present disclosure, which will not be repeated herein for simplicity.

The present disclosure is described with reference to flowcharts and/or block diagrams of the methods, devices (systems), and computer program products provided in the implementations of the present disclosure. It can be understood that each flow in the flow chart and/or each block in the block diagram and a combination of flows in the flow chart and/or blocks in the block diagram may be implemented by computer program instructions. These computer program instructions can be in a processor of a general-purpose computer, a special-purpose computer, an embedded processing machine, or other programmable data processing device to produce a machine, so as to produce a device with instructions executed by the processor of the computer or other programmable data processing device, where the device is configured to realize functions specified in one flow or multiple flows in a flow chart and/or one block or multiple blocks in a block diagram.

These computer program instructions may also be stored in a computer readable memory that can guide a computer or other programmable data processing device to work in a specific manner, so that the instructions stored in the computer readable memory can enable a generation of a product including an instruction device. The instruction device implements the functions specified in one flow or multiple flows in a flow chart and/or one block or multiple blocks in a block diagram.

These computer program instructions can also be loaded onto a computer or other programmable data processing device, so that a series of operating steps can be performed on the computer or other programmable device to generate computer-implemented processing, and thus the instructions executed on the computer or other programmable device can provide steps for implementing the functions specified in one flow or multiple flows in a flow chart and/or one block or multiple blocks in a block diagram.

The above are only implementations of the present disclosure and not intended to limit the protection scope of the present disclosure. Any modification, equivalent replacement and improvement made within the spirit and principle of the present disclosure should be within the protection scope of the present disclosure.

What is claimed is:

1. A method for activating a semi-persistently configured resource, comprising:
   receiving, by a terminal device, a first instruction, wherein the first instruction is used for activating a semi-persistently configured resource of a first bandwidth part (BWP) in a non-activated state;
   activating, by the terminal device, the semi-persistently configured resource of the first BWP according to the first instruction; and
   in response to the terminal device performing BWP switching to activate the first BWP:
   transmitting, by the terminal device, data on the first BWP by adopting the semi-persistently configured resource;
   wherein the semi-persistently configured resource is activated before activating the first BWP.

2. The method of claim 1, wherein a starting position of a cycle of the semi-persistently configured resource is determined by a time point at which the first BWP is activated by the terminal device.

3. The method of claim 2, wherein the time point at which the first BWP is activated by the terminal device comprises:
   a time point at which a BWP switching instruction is received by the terminal device;
   a time point at which a random access process that causes the BWP switching is initiated; or
   a time point at which a pre-configured timer reaches a preset duration.

4. The method of claim 1, wherein the first instruction and a BWP switching instruction are the same radio resource control (RRC) signaling, wherein the BWP switching instruction is used for BWP switching.

5. The method of claim 1, wherein the first instruction at least comprises any of downlink control information (DCI), an RRC signaling, and a media access control control element (MAC CE).

6. The method of claim 5, wherein the DCI or the RRC signaling comprises:
an indication field containing an index of one non-activated BWP or a group of non-activated BWPs; or
an index of a semi-persistently configured resource of one non-activated BWP or a group of non-activated BWPs.

7. The method of claim 5, wherein a physical downlink control channel (PDCCH) carrying the DCI is scrambled with a first radio network temporary identifier (RNTI), wherein the first RNTI is different from a cell radio network temporary identifier (C-RNTI) and a configured scheduling radio network temporary identifier (CS-RNTI).

8. The method of claim 1, wherein the semi-persistently configured resource comprises at least one of:
an uplink semi-persistently configured resource of Type2, a downlink semi-persistently configured resource, a semi-persistently configured channel state information reference signal (CSI-RS) resource, a semi-persistently configured channel state information (CSI) resource, or a semi-persistently configured sounding reference signal (SRS) resource.

9. A method for activating a semi-persistently configured resource, comprising:
transmitting, by a network device, a first instruction, wherein the first instruction is used for directing a terminal device to activate a semi-persistently configured resource of a first bandwidth part (BWP) in a non-activated state, such that the terminal device activates the semi-persistently configured resource of the first BWP according to the first instruction;
in response to the terminal device performing BWP switching to activate the first BWP:
transmitting, by the network device, data on the first BWP by adopting the semi-persistently configured resource;
wherein the semi-persistently configured resource is activated before activating the first BWP.

10. The method of claim 9, wherein the first instruction and a BWP switching instruction are the same radio resource control (RRC) signaling, wherein the BWP switching instruction is used for BWP switching.

11. A terminal device comprising:
a transceiver;
at least one processor; and
a memory storing computer programs which, when executed by the at least one processor, cause the transceiver to:
receive a first instruction, wherein the first instruction is used for activating a semi-persistently configured resource of a first bandwidth part (BWP) in a non-activated state; and
the computer programs, when executed by the at least one processor, further cause the at least one processor to:
activate the semi-persistently configured resource of the first BWP according to the first instruction;
the computer programs, when executed by the at least one processor, further causing the transceiver to transmit data on the first BWP by adopting the semi-persistently configured resource, in response to the terminal device performing BWP switching to activate the first BWP;
wherein the semi-persistently configured resource is activated before activating the first BWP.

12. The terminal device of claim 11, wherein a starting position of a cycle of the semi-persistently configured resource is determined by a time point at which the first BWP is activated by the terminal device.

13. The terminal device of claim 12, wherein the time point at which the first BWP is activated by the terminal device comprises:
a time point at which a BWP switching instruction is received by the terminal device;
a time point at which a random access process that causes the BWP switching is initiated; or
a time point at which a pre-configured timer reaches a preset duration.

14. The terminal device of claim 13, wherein the first instruction and a BWP switching instruction are the same radio resource control (RRC) signaling, wherein the BWP switching instruction is used for BWP switching.

15. The terminal device of claim 11, wherein the first instruction at least comprises any of downlink control information (DCI), an RRC signaling, and a media access control control element (MAC CE).

* * * * *